(No Model.) 2 Sheets—Sheet 1.
M. BERNIER.
TRICYCLE.
No. 514,206. Patented Feb. 6, 1894.
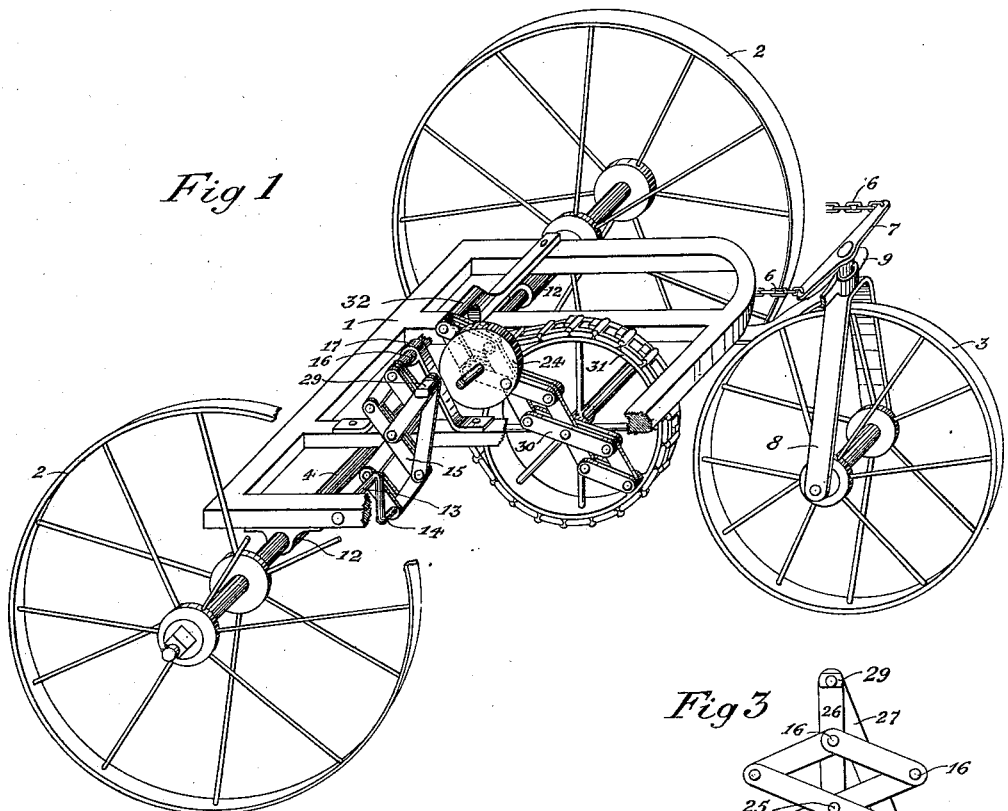
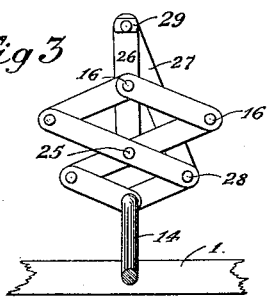
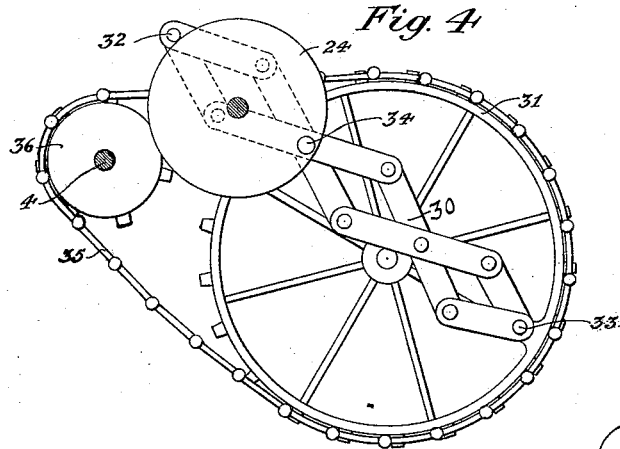
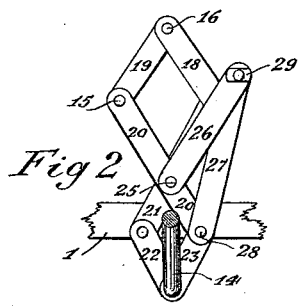
Witnesses
A. B. Choate.
A. H. Nunn.
Mitchel Bernier
Inventor
By Chas H. Cairns
Attorney.
THE NATIONAL LITHOGRAPHING COMPANY,
WASHINGTON, D. C.

(No Model.) 2 Sheets—Sheet 2.

M. BERNIER.
TRICYCLE.

No. 514,206. Patented Feb. 6, 1894.

Witnesses
A. B. Choate.
A. H. Nunn.

Mitchel Bernier
Inventor
By Chas. H. Cairns
Attorney

UNITED STATES PATENT OFFICE.

MITCHEL BERNIER, OF MINNEAPOLIS, MINNESOTA, ASSIGNOR OF ONE-HALF TO SYLVANUS H. QUIMBY, OF SAME PLACE.

TRICYCLE.

SPECIFICATION forming part of Letters Patent No. 514,206, dated February 6, 1894.

Application filed July 8, 1892. Serial No. 439,414. (No model.)

*To all whom it may concern:*

Be it known that I, MITCHEL BERNIER, a citizen of the United States, residing at Minneapolis, in the county of Hennepin and State of Minnesota, have invented certain new and useful Improvements in Tricycles, of which the following is a specification.

My invention relates to a pedal, or means for communicating the pressure of the foot to the crank of a tricycle, so that the crank may be turned; and to an extension arm or means for transmitting the motion given the crank shaft to a wheel not centered upon the crank shaft, for propelling the machine; and the object of my improvement is to lessen the motion of the foot required, and to increase the speed of the tricycle. I attain these objects by the mechanism illustrated in the accompanying drawings, in which—

Figure 5:
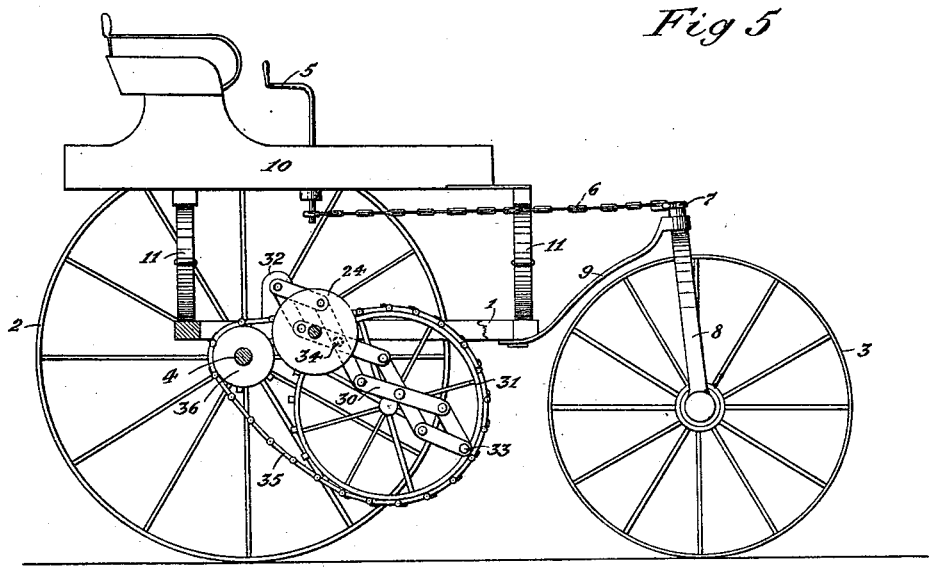
Figure 6:
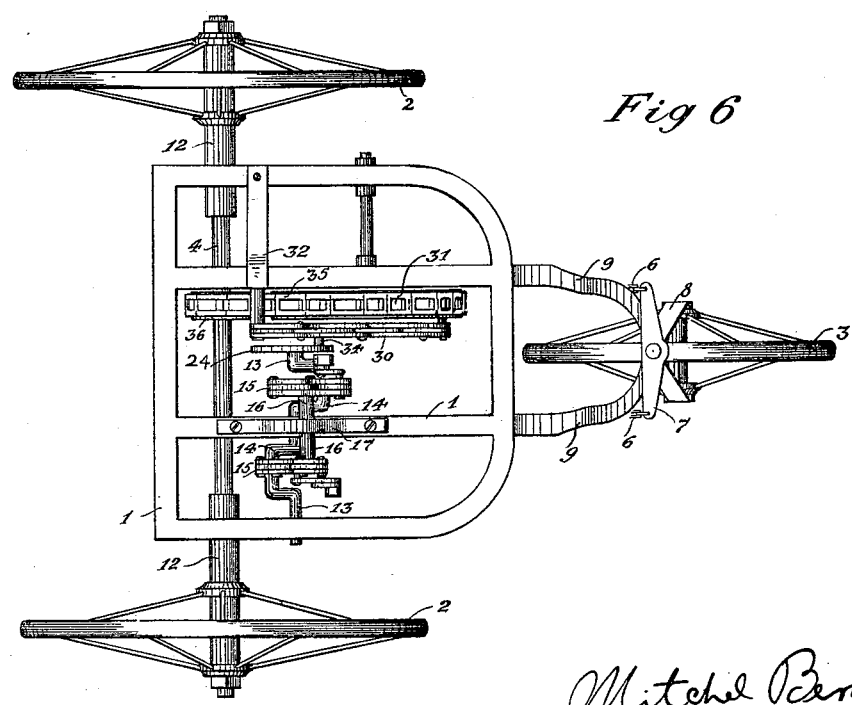

Figure 1 is a view from the front corner of the tricycle looking obliquely downward upon it, with the bed or seat removed and parts broken away, so as to show one of the pedals and the extension arm with connections. Figs. 2 and 3 are details showing side views of the pedal and crank at different points in the revolution of the crank shaft, on a larger scale. Fig. 4 is a detail showing an enlarged side view of the extension arm with attachments. Fig. 5 is a side elevation of the machine, with one wheel and the parts between it and the extension arm removed. Fig. 6 is a plan view with the seat or bed removed.

The same numerals refer to the same parts throughout the several views.

The numeral 1 represents the frame of the tricycle; 2, 2 the side wheels, and 3 the front or guide wheel. The wheels 2, 2 should be rigidly attached to the axle 4, while the guide wheel 3 is pivoted in the usual manner, and may be controlled by the hands of the rider through the crank or handle 5, Fig. 5, the chains 6, 6 and cross arm 7, which is rigidly attached to the yoke 8, or by any other suitable mechanism. Metal straps 9 may be secured to the frame 1, and the yoke 8 pivoted to the forward end of these straps, as shown in Figs. 5 and 6, or the frame may be extended forward in a similar manner, but this mechanism forms no part of my invention.

A bed 10 provided with a seat for the rider, may be mounted upon springs 11 attached to the frame 1, as shown in Fig. 5, with suitable openings in the bottom of the bed to allow the rider to operate the pedals with his feet, or the bed and springs may be omitted and any appropriate seat may be provided for the rider and mounted upon the frame. Sleeves 12, 12 may be mounted upon the axle 4 and the rear end of the frame 1 secured to these sleeves, so that the axle may revolve within the sleeves 12, 12, Figs. 1 and 6.

In Figs. 1 and 6, 13 is the crank shaft bent so as to form two cranks, 14, 14, upon the shaft. These cranks will preferably extend in opposite directions. The crank shaft 13 is loosely secured to the frame 1 transversely, as shown in Figs. 1 and 6, so that it may revolve, and its inner end may be made to terminate in the center of a wheel or circular plate 24. The pedals 15, 15 are loosely mounted at the lower end, one each upon the cranks 14, while at the upper end these pedals are loosely secured to a pin 16 which is borne upon a support 17 attached to the frame 1. The pedals 15 consist of a series of links 18, 19, 20, 21, 22, 23, preferably of metal, attached together upon pivots, as shown in Figs. 2 and 3, so as to permit extension and folding up as the crank is turned. I do not confine myself to any definite number of these straps to be used nor to any precise proportions as to their length; but I prefer to have the series 18, 19 and the parts of series 20, 21, above the point where 20, 21 are pivoted together, of equal length; and likewise the lower parts of 20, 21 together with 22, 23 of equal length, but somewhat shorter than the first named, as shown in Figs. 2 and 3. The straps may also be alternately single and double, and this I prefer, that is 19, 21 and 23 single, and 18, 20 and 22 consisting of two straps between which the others are pivotally secured, as shown in Figs. 1 and 6. Upon the outer end of the pin or pivot 25, which secures the straps 20, 21 together, I mount the lower end of a standard 26, while a brace 27, is mounted at its lower end upon the pin 28 in a similar manner, Figs. 2 and 3. The upper ends of the standard 26 and brace 27 are secured together and any suitable foot-rest 29 is secured to them. By the downward pressure of the foot of the rider upon the foot-rest, the folding parts of the pedal are extended so as to drive the crank to its lowest point in the revolution, when the pressure of the foot is released, and pressure applied to the other pedal and crank to permit the first to rise to the highest point, during which the parts of the pedal fold up, and the process is again repeated and so on.

By the revolution of the crank shaft 13, the wheel 24 is made to revolve, and I communicate this motion, by means of the extension arm 30, to the sprocket-wheel 31 Fig. 1. This extension arm, as shown by the drawings, is constructed similar to the folding parts of pedals 15 above described. It is pivoted at one end to the support 32, which is attached to the frame 1 as shown in Figs. 1, 5 and 6, and at the other end is pivoted upon a pin 33 which projects from the sprocket-wheel 31 near its circumference, Figs. 4 and 5. A pin 34 which is secured to and projects from the side of the wheel 24, near its circumference, passes through the extension arm 30 at its second joint from the upper rear end of such extension arm, as shown in Figs. 4, 5 and 6.

In place of the wheel 24 with its pin 34, a crank rigidly secured to the crank shaft 13, and loosely attached to the extension arm in a similar way, may be used. When the crank shaft 13 is made to revolve, the wheel 24 revolves with it, and its pin 34 is carried around causing the extension arm to extend forward, its forward end then to move downward and backward and the arm to fold up, with each revolution of the crank shaft. In other words, the forward end of the extension arm, with each revolution of the crank shaft, is made to describe a circle of which the center is the axle of the sprocket-wheel 31, while pin 33 moves in the circumference of the circle. Consequently the sprocket-wheel 31 is made to revolve once with each revolution of the crank-shaft. There is no dead point encountered in the action of such extension arm, as occurs in the operation of the ordinary connecting rod.

In the extension arm, as in the case of the folding parts of the pedal above described, I do not confine myself to any definite number of straps, or series of straps, to be used, nor to any precise proportions as to their length, but I prefer to have the straps at the end which attaches to sprocket-wheel 31 shorter than the others, and to have them increase in length toward the other end of the extension arm. The power and efficiency of the mechanism is thereby increased, and I have found the number of straps and the proportions shown in Fig. 4, desirable. There the straps and parts thereof forming the four sides of the diamond figure next to the sprocket-wheel, equal one unit each; those of the middle diamond, one and one-fourth each, and of the upper diamond, one and one-half each.

The sprocket-wheel 31 may be loosely secured to the frame in any suitable manner, as shown in Figs. 1, 5 and 6, and a chain 35 used to transmit its motion to another sprocket-wheel 36, centered upon and rigidly secured to the axle 4 of the tricycle, Figs. 4, 5 and 6. Since the wheels 2, 2 are rigidly secured to the axle, as before stated, the revolution of the sprocket-wheel 36 causes the tricycle to move over the ground in response to the pedal action of the rider's feet, and a machine of great speed and ease of locomotion is produced. Since the power by which locomotion of a tricycle is effected might be applied by some other means than the rider's feet, I do not wish to confine myself to such method of producing it in relation to the extension arm.

What I claim as my invention, and desire to secure by Letters Patent, is—

1. In a tricycle, the combination of an extension arm, consisting of a series of extending and folding straps or levers, said series being loosely secured at one end upon the frame, at the other end upon the wheel to which motion is to be transmitted and loosely attached intermediately to the disk or wheel from which rotary motion is to be carried, for the purpose of transmitting such motion in driving the machine, substantially as set forth.

2. In a tricycle, the combination of a crank shaft, a disk revolving therewith, a wheel to which its motion is to be transmitted, the extension arm loosely secured, at one end, upon the frame, at the other end upon a pivot outside the center of said wheel, and loosely attached immediately to the disk, substantially as shown and described.

3. In a tricycle, the combination of a crank shaft, pedals consisting of a series of extending and folding straps or levers, with means for extending such pedals alternately, by the pressure of the rider's feet, for the purpose of revolving such crank shaft, a disk revolving therewith, a wheel to which its motion is to be transmitted, the extension arm loosely secured at one end upon the frame, at the other end upon said wheel, and loosely attached intermediately to the disk, with mechanism connecting said wheel with the driver wheels of the machine for the purpose of locomotion, substantially as set forth.

MITCHEL BERNIER.

Witnesses:
 A. B. CHOATE,
 CHAS. S. CAIRNS.